United States Patent [19]
Planeta et al.

[11] Patent Number: 5,690,972
[45] Date of Patent: Nov. 25, 1997

[54] ANNULAR CO-EXTRUSION DIE

[75] Inventors: Mirek Planeta; Surendra M. Sagar, both of Mississauga; Weining Song, Markham, all of Canada

[73] Assignee: Macro Engineering & Technology Inc., Mississauga, Canada

[21] Appl. No.: 674,004

[22] Filed: Jul. 1, 1996

[51] Int. Cl.$^6$ .................................. B29C 47/26
[52] U.S. Cl. .............. 425/133.1; 264/171.27; 264/173.16; 264/176.1; 425/192 R; 425/380; 425/462
[58] Field of Search ............... 425/133.1, 191, 425/192 R, 461, 462, 380; 264/173.16, 176.1, 171.27

[56] References Cited

U.S. PATENT DOCUMENTS

| | | | |
|---|---|---|---|
| 3,802,826 | 4/1974 | St. Eve | 425/462 |
| 3,809,515 | 5/1974 | Farrell | 425/462 |
| 3,890,083 | 6/1975 | St. Eve | 425/462 |
| 4,522,775 | 6/1985 | Briggs et al. | 425/462 |
| 4,687,430 | 8/1987 | Morris et al. | 425/133.1 |
| 4,798,526 | 1/1989 | Briggs et al. | 425/462 |
| 5,069,612 | 12/1991 | Teutsch et al. | 425/133.1 |
| 5,076,776 | 12/1991 | Yamada et al. | 425/462 |
| 5,393,216 | 2/1995 | Teutsch et al. | 425/462 |
| 5,460,772 | 10/1995 | Ohta | 425/133.1 |
| 5,538,411 | 7/1996 | Gates | 425/133.1 |

*Primary Examiner*—Jay H. Woo
*Assistant Examiner*—Joseph Leyson
*Attorney, Agent, or Firm*—Rogers & Scott

[57] ABSTRACT

An annular co-extrusion die for extruding multi-layer tubular plastic film has inner die members stacked one upon another. The inner die members have radially outwardly extending surfaces forming radially outwardly extending helical passages between respective pairs of die members. An annular outer die member surrounds the stacked inner die members and forms a longitudinally extending annular passage therebetween for conveying plastic material from the radially outwardly extending helical passages to an annular extrusion orifice. Each inner die member forms with an adjacent die member a first feed passage extending at least partly around the inner die member radially inwardly of the helical passages, the inner die member and the adjacent die member having a circumferentially extending clearance therebetween to enable plastic material fed into the first feed passage to pass through the clearance into the helical passages. Each inner die member also has at least one further feed passage extending substantially parallel to the longitudinal axis of the die from the lower end of the inner die member to an upper end thereof for communication with a feed passage or passages of the inner die member immediately above. The die also having passages in a lower end portion thereof for feeding different plastic materials from extruders to respective passages in the inner die members.

7 Claims, 5 Drawing Sheets

ANNULAR CO-EXTRUSION DIE

BACKGROUND OF THE INVENTION

Such extrusion dies have been known for many years. Conventional dies of this kind have usually had a series of concentric radially spaced die members of different diameters which define concentric radially spaced annular passages for separately feeding different plastic materials to a common annular passage for subsequent extrusion through a die orifice as a multi-layer tubular plastic film. Dies of this kind are satisfactory for producing tubular plastic film with up to about three layers.

However, there are present day requirements for tubular plastic film with a greater number of layers. The conventional concentric radially spaced die member arrangement mentioned above is not particularly satisfactory for more than about three layers because of the resultant larger diameter of the die.

In recent years, multi-layer co-extrusion dies have been made with die members stacked one above the other to form annular feed passages for the different plastic materials. Such dies have advantages over the conventional concentric radially spaced die member arrangement in that they can be more easily modified to vary the number of layers and the die diameter does not increase with the number of layers.

Known annular co-extrusion dies with stackable die members have usually been designed such that plastic materials are fed from extruders into radially outer portions of annular passages formed between the stacked die members. This is satisfactory for dies up to a diameter of about 18 inches, but such a feed arrangement is not particularly suitable for larger diameter dies of this kind. For larger dies of this kind therefore, it would be advantageous if the plastic materials could be fed to radially inner portions of the stacked die members. Attempts have been made to design a suitable internal feed arrangement, but prior attempts have not been particularly successful.

It is therefore an object of the present invention to provide an annular co-extrusion die with stacked die members in which plastic materials are fed to radially inner portions of annular passages formed between the die members in an advantageous manner.

SUMMARY OF THE INVENTION

According to the invention, an annular co-extrusion die for extruding multilayer tubular plastic film comprises inner die members stacked one upon the other and having radially outwardly extending surfaces forming radially outward extending helical passages between respective pairs of die members. An annular outer die member surrounds the stacked inner die members and forms a longitudinally extending annular passage therebetween for conveying plastic material from the radially outwardly extending helical passages to an annular extrusion orifice. Each inner die member forms with an adjacent die member a first feed passage extending at least partly around the inner die member radially inwardly of the helical passages, the inner die member and adjacent die member having a circumferentially extending clearance therebetween to enable plastic material fed into the first feed passage to pass through clearance into the helical passages. Each inner die member also has at least one further feed passage extending substantially parallel to the longitudinal axis of the die from the lower end of the inner die member to an upper end thereof for communication with a feed passage or passages of the inner die member immediately above. The die also has passages in a lower end thereof for feeding different plastic materials from extruders to respective passages in the inner die member.

The radially outwardly inclined surfaces may be inclined to the longitudinal axis of the die at an angle in the range of from about 5 to about 90 degrees, for example about 20 degrees. Alternatively, the radially outwardly extending surfaces may be inclined to the longitudinal axis of the die at an angle of about 90 degrees.

The annular outer die member may comprise annular sections stacked one upon another, with radially outer portions of adjacent sections being separated by an annular air gap, and each inner die member co-operating with a different outer die member section to form a portion of the longitudinally extending annular passage.

The die may also have an angularly adjustable connector ring at its lower end with passages for supplying different plastic materials from extruders to respective passages in the die members, whereby the angular position of the connector ring can be adjusted to cause the different plastic materials to be fed to different inner die members.

At least two of the inner die members may be identical and interchangeable to cause different plastic materials to be fed to different inner die members.

BRIEF DESCRIPTION OF THE DRAWING

Embodiments of the invention will now be described, by way of example, with reference to the accompanying drawings, of which.

DESCRIPTION OF THE PREFERRED EMBODIMENTS

Figure 1:
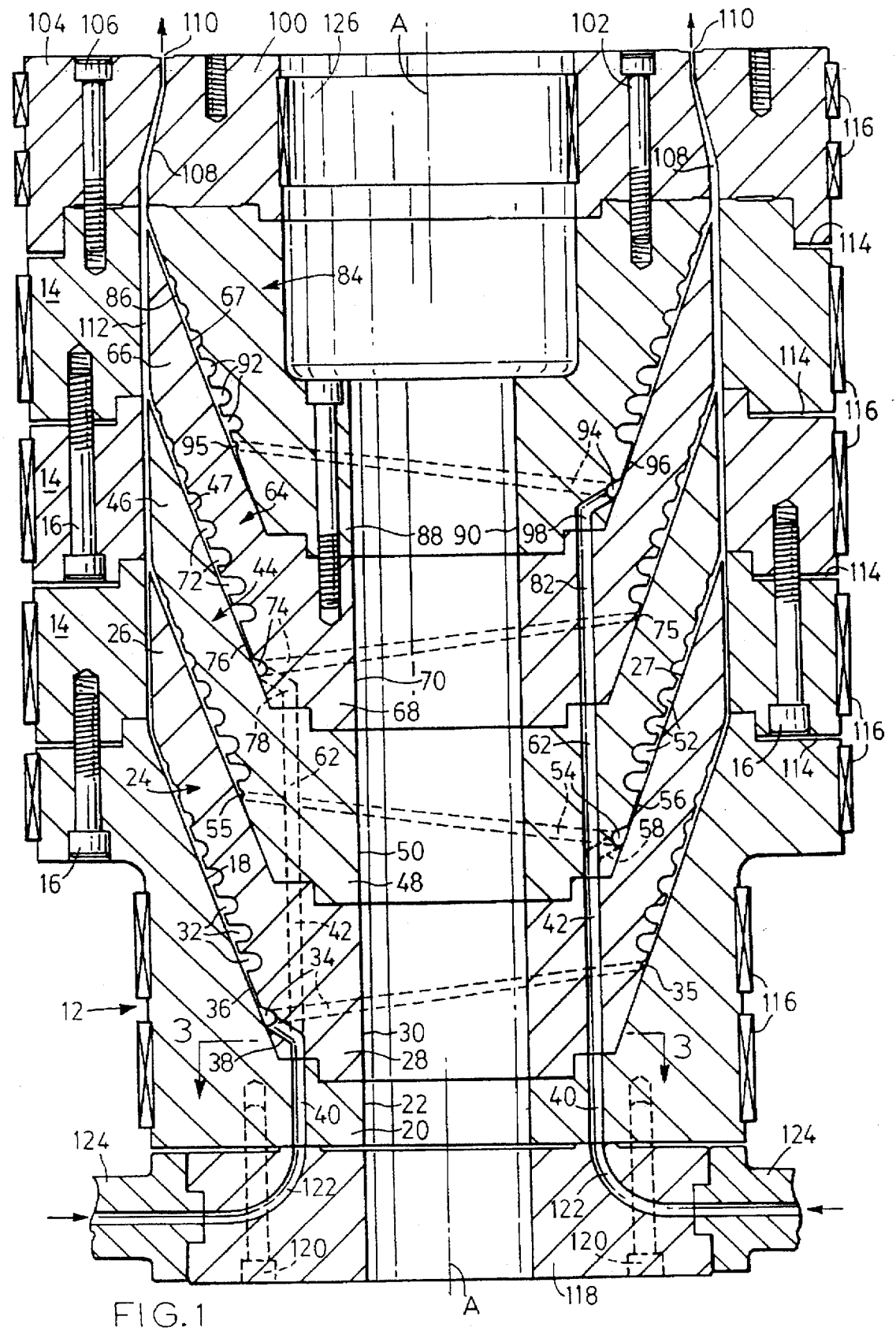
FIG. 1 is a sectional, somewhat diagrammatic, view of an annular co-extrusion die in accordance with one embodiment of the invention.
Figure 2:
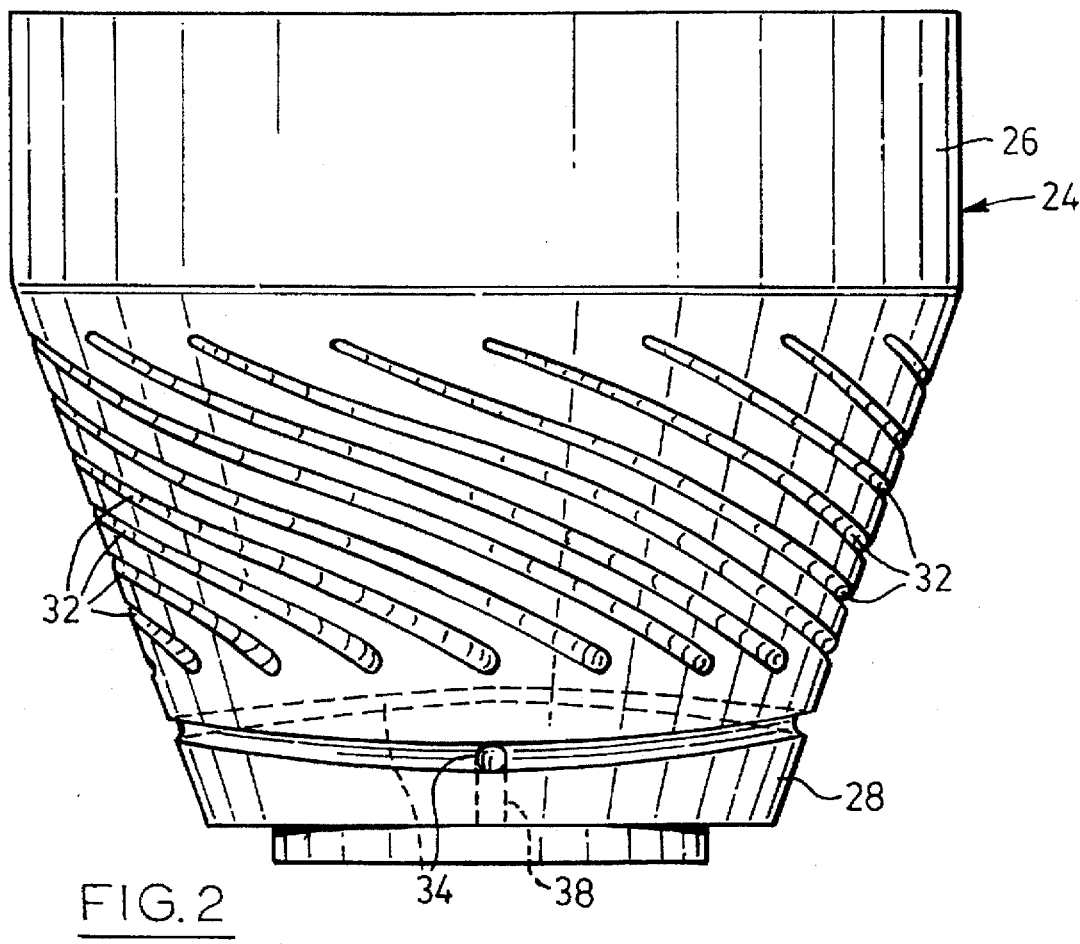
FIG. 2 is a side view, on a slightly enlarged scale and from the left of FIG. 1, of one of the mandrels of the die of FIG. 1.
Figure 3:
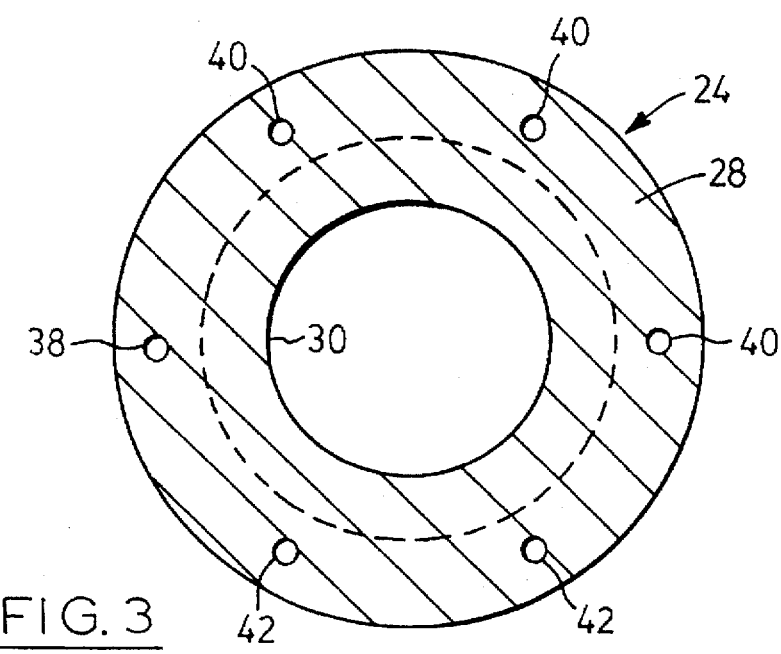
FIG. 3 is a sectional view, also on a slightly enlarged scale, of the mandrel taken along the line 3—3 of FIG. 1.

Referring to the drawings, FIG. 1 to 3 show an annular co-extrusion die comprising a lower annular outer die body member 12 and a series of annular outer die body members 14 stacked one upon another and each secured to an adjacent outer die member by bolts 16. The lower outer die member 12 has a radially outwardly and upwardly extending inner surface 18 which extends at an angle of 20 degrees to the longitudinal axis of the die. The lower outer die member 12 also has a base 20 with a central aperture 22.

A first inner die mandrel 24 has a radially outwardly and upwardly extending side wall 26 and a base 28 with a central aperture 30. The lower die mandrel 24 fits snugly into the lower outer die member 12. The outer surface of the side wall 26 has a series of helical grooves 32 which co-operate with the inner surface 18 of outer die body member 12 to form radially outwardly and upwardly extending helical passages therebetween. As is readily apparent from FIG. 2, the helical grooves 32 have multiple starts at their lower ends.

Below the helical grooves 32, the outer surface of side wall 26 has a first feed groove 34 extending half way around the circumference of the outer surface of side wall 26 in slightly upwardly inclined opposite directions from a feed passage 38 to a peak 35 diametrically opposite the feed passage 38. The outer surface of side wall 26 of mandrel 24 and the inner surface 18 of the outer die body member 12 have a small clearance 36 therebetween between the first feed groove 34 and the helical grooves 32. The feed passage 38 extends from the bottom surface of the base 28 of the die mandrel 24 to the first feed groove 34. The base 20 of outer die body member 12 has a series of circumferentially spaced feed passages 40 extending vertically upwardly therethrough from the bottom to the top thereof, one of the feed passages 40 being in communication with feed passage 38 in mandrel 24.

The mandrel 24 also has a series of circumferentially spaced passages 42 extending vertically upwardly from the bottom to the top thereof for a purpose which will be described in more detail later.

A second die mandrel 44 which is identical to the lower mandrel 24 is mounted on top of the mandrel 24 and is nested therein, i.e. in stacked relationship therewith. The second mandrel 44 has a radially outwardly and upward extending side wall 46 and a base 48 with a central aperture 50. The outer surface of side wall 46 has a series of helical grooves 52 which co-operate with the inner surface 27 of first mandrel 24 to form radially outwardly and upward extending helical passages therebetween. As before, the helical grooves 52 have multiple starts at their lower ends. Below helical groove 52, the outer surface of side wall 46 has a first feed groove 54 extending at least half way around the circumference of the outer surface of side wall 46 in a slightly upwardly inclined opposite directions from a feed passage 58 to a peak 55 diametrically opposite the feed passage 58. The outer surface of side wall 46 of mandrel 44 and the inner surface of side wall 26 of mandrel 24 have a small clearance 56 therebetween between the first feed groove 54 and the helical groove 52.

The feed passage 58 extends from the bottom of the base 48 of the mandrel 44 to the first feed groove 54, one of the passages 42 in the base 28 of the lower mandrel 24 being in communication therewith. The mandrel 44 also has a series of circumferentially spaced passages 62 extending vertically upwardly from the bottom to the top thereof, each passage 62 being in alignment with a respective passage 42 in the base 28 of lower mandrel 24.

A third die mandrel 64 identical to the lower mandrels 24, 44 is mounted on top of 44 and is nested therein, i.e. in stacked relationship therewith. The mandrel 64 has a radially outwardly and upward extending side walls 66 and a base 68 with a central aperture 70. The outer surface of side wall 66 has a series of helical grooves 72 which co-operate with the inner surface 47 of mandrel 44 to form radially outwardly and upward extending helical passages therebetween. Again, the helical grooves 72 have multiple starts at their lower ends.

Below the helical groove 72, the outer surface of side wall 66 has a feed groove 74 extending half way around the circumference of the outer surface of side wall 66 in slightly upwardly inclined opposite directions from a feed passage 78 to a peak 75 diametrically opposite the feed passage 38. The outer surface of side walls 66 of mandrel 64 and the inner surface of side wall 46 of mandrel 44 have a small clearance 76 therebetween between the feed groove 74 and the helical groove 72.

The feed passage 78 extends from the bottom of the base 68 of the mandrel 64 to the feed groove 74, one of the passages 62 in the base 48 being in alignment therewith, and with the passage 62 being in alignment with one of the passages 42 in the base 28 of the mandrel 24. The mandrel 64 also has a series of circumferentially spaced passages 82 extending vertically upwardly from the bottom to the top thereof, each of the passages 82 being in alignment with a respective passage 62 in the base 48 of the lower mandrel 44.

A further and uppermost die mandrel 84 is mounted on top of the third mandrel 64 and is nested therein, i.e. in stacked relationship therewith. The mandrel 84 has a radially outwardly and upwardly inclined outer surface 86 and a base 88 with a central aperture 90. The outer surface 86 has a series of helical grooves 92 which co-operate with the inner surface 67 of mandrel 64 to form radially outwardly and upwardly extending passages therebetween. As before, the helical grooves 92 have multiple starts at their lower ends.

Below the helical groove 92, the outer surface 86 has a feed groove 94 extending halfway around the circumference of the outer surface 86 in slightly upwardly opposite inclined directions from a feed groove 98 to a peak 95 diametrically opposite the feed passage 98. The outer surface 86 and the inner surface 67 of side wall 66 of mandrel 64 have a small clearance 96 therebetween between the feed groove 94 and the helical groove 92.

The feed passage 98 extends from the bottom of the base 88 of the mandrel 84 to the feed groove 94, a passage 82 in the base 68 being in alignment therewith, and with the passage 82 being in alignment with one of the passages 62 in the base 48 of the mandrel 44.

The mandrels 24, 44, 64, 84 are secured to each other and to the lower outer die body member 12 by bolts 99 (only one of which is shown).

An annular inner die lip member 100 is mounted on top of upper mandrel 84 and is secured thereto by bolts 102. An annular outer die lip member 104 is mounted on Upper outer die body member 14 and is secured thereto by bolts 106. The lip members 100, 104 co-operate to form an annular extrusion passage 108 and an annular extrusion orifice 110.

An annular extrusion passage 112 is formed between the outer surfaces of the side walls of the mandrels 24, 44, 64 and the inner surfaces of outer die body members 14. It will be noted that the side wall of each mandrel co-operates with a different outer die body member 14 to form a portion of the annular extrusion passage 112 which communicates with the annular extrusion passage 108 at its upper end. It will also be noted that the outer die body members 14 are separated from each other and from the lower die body member 12 and the outer lip member 104 by air gaps 114. Also, each outer die body member 14 is provided with a separate heater 116, as are also the lower die body member 12 and the outer lip member 104.

A connector ring 118 is secured to the bottom of the lower outer die body member 12 by bolts 120 and has circumferentially spaced passages extending from pipes 124 to respective passages 40 in the outer die body member 12. The pipes 124 supply different plastic materials from respective extruders (not shown).

In use, the different plastic materials are supplied from extruders through the pipes 124 to the respective passages 122 in the connector ring 118 and then to the respective passages 40 in the die body member 12. One passage 40 supplies the plastic material therein to the feed passage 38 in the first mandrel 24 and thus to the feed groove 34. The plastic material in the feed groove 34 passes upwardly through the clearance 36 to the multiple start helical grooves 32 and from the upper ends thereof to the annular passage 112. Another passage 40 supplies another plastic material to a passage 42 aligned with feed passage 58 in mandrel 44, so that this plastic material is supplied to feed groove 54 and through the clearance 56 to the helical grooves 52. The plastic material leaves the upper end of the helical grooves 52 and passes into the annular passage 112.

Another passage 40 supplies yet another plastic material through a passage 42 which is aligned with a passage 62 in mandrel 44 which feeds the plastic material to feed groove 78 in mandrel 64. This plastic material then passes through the clearance 76 to the helical groove 72 and then through the annular passage 112. A still further passage 40 supplies yet another plastic material through a passage 42, a passage 62 and a passage 82 to passage 98 and feed groove 94 in mandrel 84. This plastic material passes through clearance 96 to helical grooves 92 and then to the annular passage 112.

The resultant four layer tube of plastic material in annular passage 112 then passes upwardly through annular passage 108 and is extruded from annular die orifice 110. It will be noted that a further heater 126 is provided inside the annular inner die lip member 100.

It will be appreciated that the extrusion die described with reference to FIGS. 1–3 can be adjusted in two ways to vary the supply of different plastic materials from the extruders through pipes 124 to form different layers of the extruded tube of plastic material. Firstly, the inner die mandrels 24, 44, 64 can be angularly adjusted or interchanged with one another so as to communicate with different feed passages 40 in the base 20 of the outer die member 12. Secondly, by releasing the bolts 120, the connector ring 118 can be rotated to achieve a similar effect.

It will be noted that the extrusion die shown in FIGS. 1–3 could produce a tube of plastic material with up to six layers by the addition of further inner die mandrels and outer die body members, since the outer die member 12 has six passages 40 as shown in FIG. 3. It should also be noted that, in FIG. 1, the passages 40 and corresponding passages in the inner die members are shown for ease of explanation as being on the left or right, whereas in fact, as previously mentioned and as illustrated by FIG. 3, they are circumferentially spaced around the die members concerned.

Figure 4:
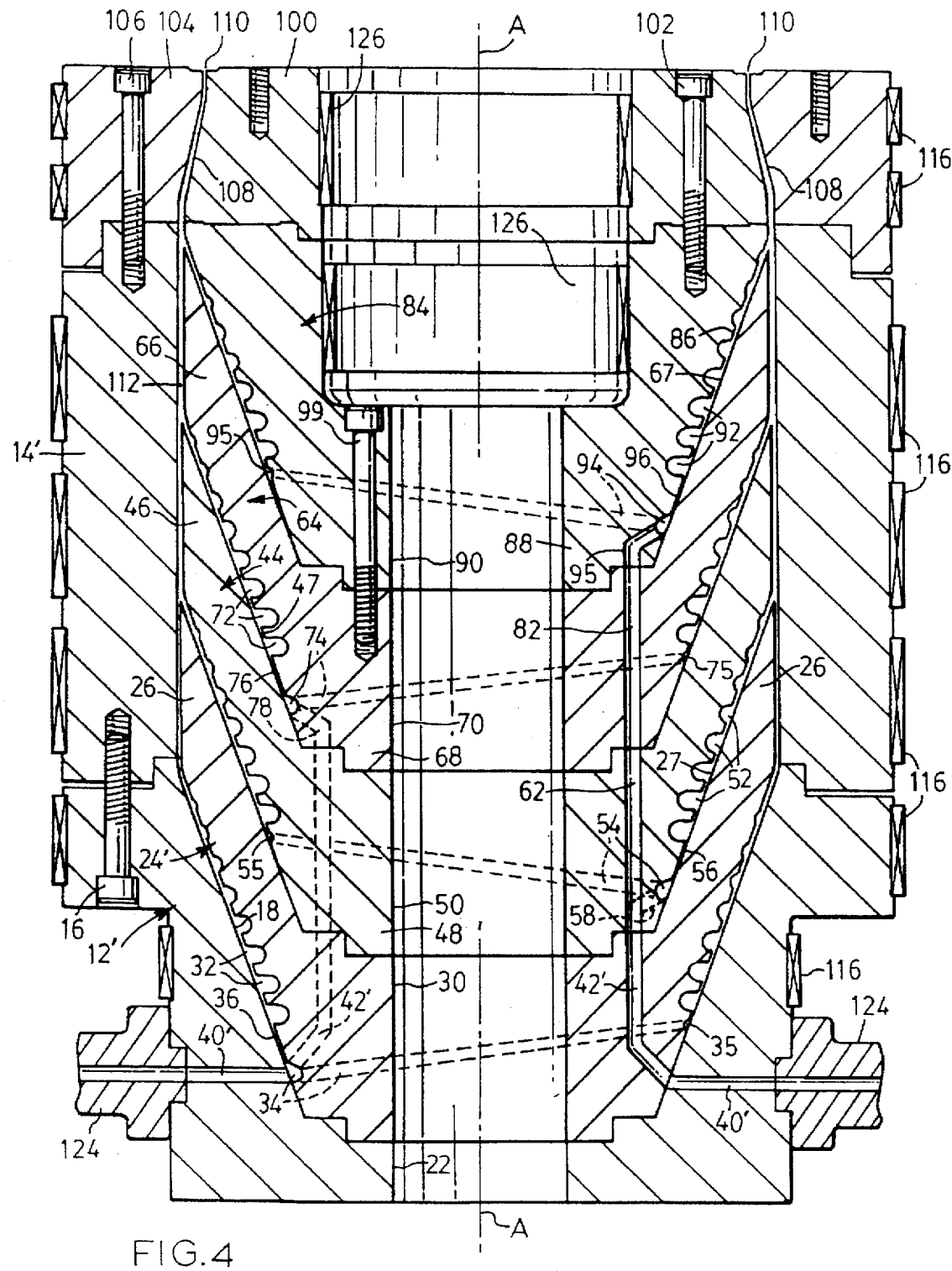
FIG. 4 is a sectional, somewhat diagrammatic, view of an annular co-extrusion die in accordance with another embodiment of the invention.

The embodiment shown in FIG. 4 is generally similar to the previous embodiment, especially with respect to the mandrels 24, 44, 64 and 84. However, the outer die body members 14 of the previous embodiment are replaced by a one piece annular outer die body member 14'. Also, the connector block 118 of the previous embodiment is omitted, and the pipes 124 are connected to passages 40' in the lower outer body member 12' which communicate with the feed groove 34 and passages 42' in the mandrel 24'.

Figure 5:
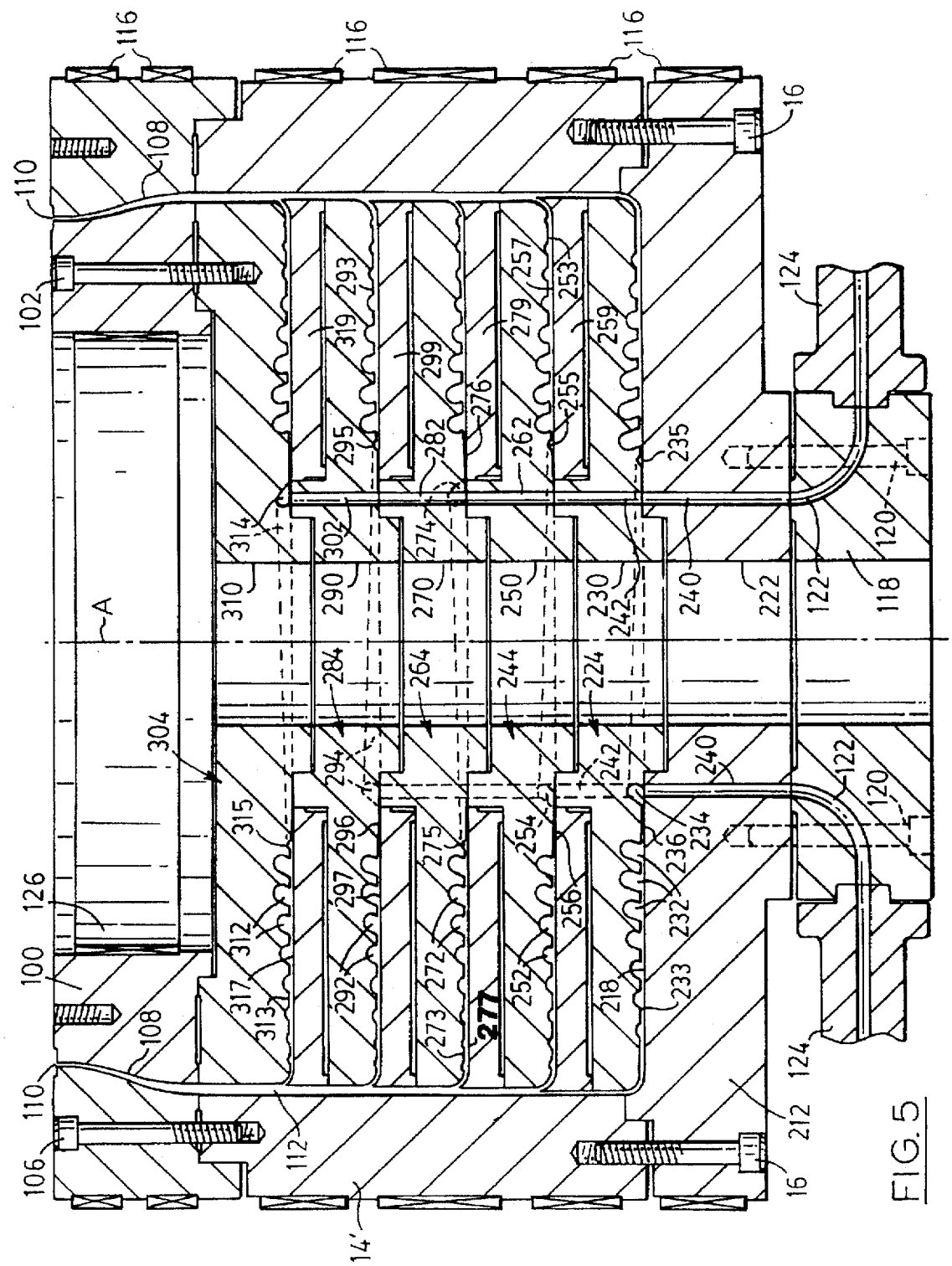
FIG. 5 is a similar view of an annular co-extrusion die in accordance with a further embodiment of the invention.

The embodiment shown in FIG. 5 primarily differs from previous embodiments in that the helical grooves extend radially outwardly at an angle to the longitudinal axis of 90 degrees instead of 20 degrees as in the previous embodiment. The connector block 118 is bolted to a lower body member 212 which has a central aperture 222 and circumferentially spaced vertical passages 240.

A first mandrel 224 with a central aperture 230 has a multi-start helical groove 232 in its horizontal annular lower surface 233 which co-operates with a horizontal annular upper surface 218 of the lower body member 212 to form a helical passage. The lower surface 233 also has a feed groove 234 extending arcuately about halfway around the surface 233 in opposite directions from a feed passage 240 to a peak 235 diametrically opposite the feed passage 240. A small clearance 236 between the surfaces 218, 233 is provided between the feed groove 234 and the multi-start helical grooves 232. The first mandrel 224 also has a series of circumferentially spaced vertical passages 242.

A second mandrel 244 identical to the first mandrel 224 is stacked on top therewith in nesting relationship, the second mandrel 244 has a central aperture 250 and a multi-start helical groove 252 in its horizontal lower annular surface 253 which co-operates with an upper horizontal annular surface 257 of an annular spacer 259 seated on top of the first mandrel 224. The lower surface 253 also has a feed groove 254 extending arcuately about halfway around the surface 253 in opposite directions from a feed passage 254 to a peak 255 diametrically opposite the passage 254. A small clearance 256 between the surfaces 257, 253 is provided between the feed groove 254 and the multi-start helical grooves 252. The second mandrel 244 also has a series of circumferentially spaced passages 262.

A third mandrel 264 identical to the lower mandrels 224, 244 is stacked on top of the mandrel 244 in nested relationship. The third mandrel 264 has a central aperture 270 and a multi-helical groove 272 in its horizontal lower surface 273 which co-operates with an upper horizontal annular surface 277 of an annular spacer 279 seated on top of the second mandrel 244. The lower surface 273 also has feed groove 274 extending arcuately about half way around the surface 273 in opposite directions from a feed passage 274 to a peak 275 diametrically opposite the passage 274. A small clearance 276 between the surfaces 277, 273 is provided between the feed groove 274 and the multi-start helical grooves 272. The third mandrel 264 also has a series of circumferentially spaced passages 282.

A fourth mandrel 284 identical to the lower mandrels 224, 244 264 is stacked on top of the mandrel 264 in nested relationship. Fourth mandrel 284 has a central aperture 290 and a multi-start helical groove 292 in its horizontal lower surface 293 which co-operates with an upper horizontal annular surface 297 in an annular spacer 299 seated on top of the mandrel 264. The lower surface 293 also has a feed groove 294 extending arcuately about halfway around the surface 293 in opposite directions from the feed passage 282 to a peak 295 diametrically opposite the passage 282. A small clearance 296 between the surfaces 297, 293 is provided between the feed groove 294 and the multi-start helical groove 292. The fourth mandrel 284 also has a series of circumferentially spaced vertical passages 302.

A fifth mandrel 304 is stacked on top of the mandrel 284 in nested relationship. The fifth mandrel 304 has a central aperture 310 with a multi-start helical groove 312 in its horizontal lower annular surface 313 which co-operates with a horizontal upper annular surface 317 in an annular spacer 319 seated on top of the mandrel 284. The lower surface 313 also has a feed groove 314 extending arcuately about halfway around the surface 313 in opposite directions from a feed passage 302 to a peak 315 diametrically opposite the passage 302.

Figure 6:
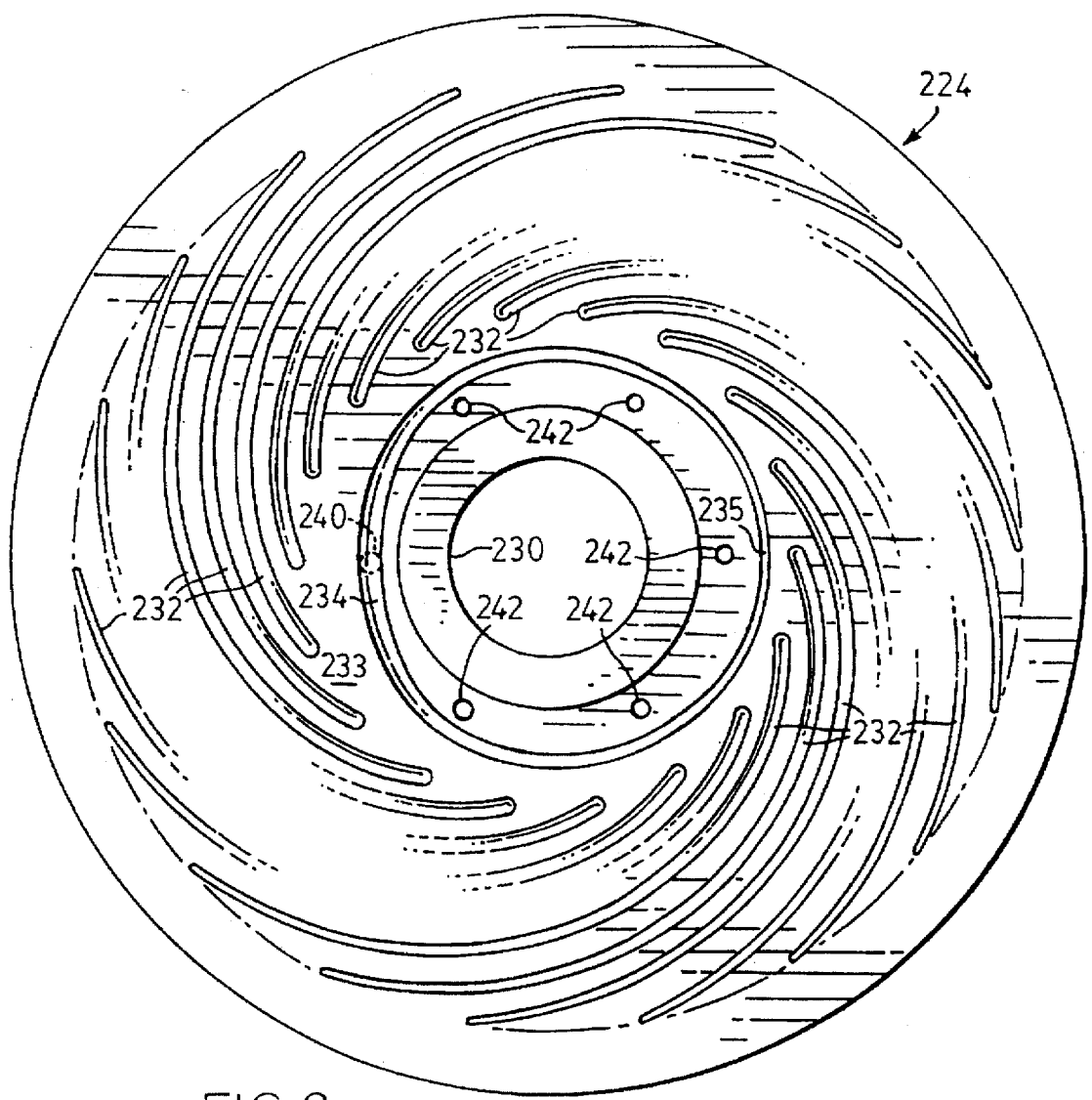
FIG. 6 is a bottom view of one of the mandrels of the die of FIG. 5.

The die shown in FIGS. 5 and 6 functions in a similar manner to the previously described dies. Different plastic materials are fed from extruders through points 124 and various vertical passages to the feed passages of respective mandrels and through the respective clearances and helical grooves to the common annular passage 112, the annular passage 108 and the die orifice 110.

It will be readily apparent to a person skilled in the art from the above-described embodiment that the invention provided an advantageous manner of feeding plastic materials internally to the stacked mandrels of an annular co-extrusion die.

Other embodiments of the invention will also be clearly apparent to a person skilled in the art, the scope of the invention being defined in the appended claims.

We claim:

1. An annular co-extrusion die for extruding multi-layer tubular plastic film, said die comprising:

inner die members stacked one upon another and having radially outwardly extending surfaces forming radially outwardly extending helical passages between respective pairs of said die members, each inner die member also having a central aperture, an annular outer die member surrounding said stacked inner die members and forming a longitudinally extending annular passage therebetween for conveying plastic material from said radially outwardly extending helical passages to an annular extrusion orifice, each inner die member forming with an adjacent inner die member a first feed passage extending at least partly around the inner die member radially inwardly of the helical passages, said inner die member and the adjacent inner die member having a circumferentially extending clearance therebetween to enable plastic material fed into the first feed passage to pass through said clearance into the helical passages, at least one said inner die member also having further feed passages spaced around said central aperture and extending substantially parallel to the longitudinal axis of the die from a lower end of the at least one said inner die member to an upper end thereof for respective communication with said first feed passage or at least one further feed passage of the inner die member immediately above, and the die also having passages in a lower end portion thereof for feeding different plastic materials from extruders to said further feed passages in the inner die members.

2. An annular co-extrusion die according to claim 1 wherein the radially outwardly extending surfaces are inclined to the longitudinal axis of the die at an angle in the range of from about 5 to about 90 degrees.

3. An annular co-extrusion die according to claim 2 wherein the radially outwardly extending surfaces are inclined to the longitudinal axis of the die at an angle of about 20 degrees.

4. An annular co-extrusion die according to claim 1 wherein the radially outwardly extending surfaces are inclined to the longitudinal axis of the die at an angle of about 90 degrees.

5. An annular extrusion die according to claim 1 wherein the annular outer die member comprises annular sections stacked one upon another, with radially outer portions of adjacent sections being separated by an annular air gap, and each inner die member co-operating with a different outer die member section to form a portion of the longitudinally extending annular passage.

6. An annular extrusion die according to claim 1 also including an angularly adjustable connector ring at its lower end with passages for supplying different plastic materials from extruders to said further feed passages in the die members, whereby the angular position of the connector ring is adjustable to cause the different plastic materials to be fed to different ones of said further feed passages of said inner die members.

7. An annular extrusion die according to claim 1 wherein at least two of the inner die members are identical and are interchangeable to cause different plastic materials to be fed to different ones of said further feed passages of said inner die members.

* * * * *